(12) United States Patent
Ogi et al.

(10) Patent No.: US 8,760,512 B2
(45) Date of Patent: Jun. 24, 2014

(54) WIRELESS VIDEO TRANSMISSION DEVICE AND WIRELESS VIDEO RECEPTION DEVICE

(75) Inventors: Yuya Ogi, Yokohama (JP); Nobuaki Kabuto, Kunitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 345 days.

(21) Appl. No.: 12/912,896

(22) Filed: Oct. 27, 2010

(65) Prior Publication Data
US 2011/0102589 A1 May 5, 2011

(30) Foreign Application Priority Data
Nov. 2, 2009 (JP) ................. 2009-251597

(51) Int. Cl.
*H04N 9/47* (2006.01)

(52) U.S. Cl.
USPC ............... 348/143; 348/E7.085

(58) Field of Classification Search
USPC .................................... 348/143
See application file for complete search history.

(56) References Cited

U.S. PATENT DOCUMENTS

| 5,799,241 | A | 8/1998 | Matsubara et al. | |
|---|---|---|---|---|
| 2005/0281234 | A1* | 12/2005 | Kawamura et al. | 370/338 |
| 2006/0171343 | A1 | 8/2006 | Maehara et al. | |
| 2007/0066329 | A1 | 3/2007 | Laroia et al. | |
| 2007/0136772 | A1* | 6/2007 | Weaver et al. | 725/95 |
| 2007/0171874 | A1* | 7/2007 | Tanaka | 370/332 |
| 2008/0022324 | A1* | 1/2008 | Yang et al. | 725/81 |
| 2009/0195704 | A1* | 8/2009 | Bombara | 348/734 |
| 2009/0247085 | A1* | 10/2009 | Misumi | 455/63.3 |
| 2010/0118811 | A1* | 5/2010 | Lee et al. | 370/329 |
| 2010/0280671 | A1* | 11/2010 | Lee | 700/286 |

FOREIGN PATENT DOCUMENTS

| JP | 7-303276 | 11/1995 |
|---|---|---|
| JP | 8-265823 | 10/1996 |
| JP | 2006-050521 | 2/2006 |
| JP | 2007-096462 | 4/2007 |
| JP | 2008-104100 | 5/2008 |

OTHER PUBLICATIONS

JP Office Action for Japanese Application No. 2009-251597, issued on May 21, 2013.

* cited by examiner

*Primary Examiner* — Dave Czekaj
*Assistant Examiner* — Nam Pham
(74) *Attorney, Agent, or Firm* — Antonelli, Terry, Stout & Kraus, LLP.

(57) ABSTRACT

A technique is provided for using, in a wireless video transmission device and a plurality of wireless video reception devices which intermittently perform signal reception processing within standby periods, a human body detection unit to accelerate the start-up of the wireless video transmission and reception devices. When the presence of a person is detected by the human body detector, a person detection signal is sent to a wireless video reception device or the transmission device to thereby limit usable communication channel candidates in number. The limited number of usable channel candidates are then used to perform intermittent signal reception, thereby shortening the searching time cycle of such intermittent reception within a standby period, thus lessening the startup time from the standby state between the wireless video transmission and reception devices and also reducing standby power thereof.

10 Claims, 7 Drawing Sheets

WIRELESS VIDEO TRANSMISSION DEVICE AND WIRELESS VIDEO RECEPTION DEVICE

INCORPORATION BY REFERENCE

The present application claims priority from Japanese application JP2009-251597 filed on Nov. 2, 2009, the content of which is hereby incorporated by reference into this application.

BACKGROUND OF THE INVENTION

The present invention relates to start-up acceleration technology used in wireless data communications systems including a wireless video image transmission device and wireless reception device which intermittently perform reception processing within standby periods, for making faster the startup procedure of these video transmission and reception devices while simultaneously reducing electrical power consumption in standby events.

Conventional known power-saving type wireless communication techniques for causing a central control apparatus to manage interconnection between radio terminals include a standby control method which is recited in JP-A-7-303276, for example. In this Japanese patent literature, there is disclosed a technique adapted for use with a wireless communication control scheme having a couple of radio terminal devices which intermittently perform signal reception processing within standby periods. When a calling time point of a transmission-side radio terminal is not identical to the signal reception time of a reception-side radio terminal, a control device which manages wireless communication between these radio terminals notifies the transmission-side radio terminal of the nearest signal reception time of the reception-side radio terminal. After the transmission-side radio terminal that has received such notice notified a calling connection time to the control device, transition is made to a standby state to thereby achieve steady connectivity and reduction of total electric power consumption.

Additionally, audio/video (AV) equipment power-saving techniques using a human-sensitive sensor include the one that is disclosed, for example, in JP-A-2007-96462. Disclosed in this patent literature is a technique for reducing power consumption of AV equipment by turning off the AV equipment's power supply when a predetermined length of time is elapsed after a user acted to go away from a nearby location of the AV equipment while letting the power supply of AV equipment be kept operative.

SUMMARY OF INVENTION

The above-stated prior art techniques are faced with problems which follow. In JP-A-7-303276, use of the central control device is required; also required is electrical power for activating and rendering operative the central control device per se. Although it is possible to reduce total power consumption by applying the technique as taught therefrom to large-scale wireless communications of cellular phone base stations or the like, there is a risk that it becomes unable to reduce total power consumption in small-size networks, such as a home-use one. As for JP-A-2007-96462, this fails to disclose therein any teachings about the consumed power reduction using a human-sensitive sensor in the case of performing wireless communications.

This invention has been made in view of the above-stated problems, and an object of the invention is to provide a technique capable of speeding up the startup of a device(s) and reducing electrical power consumption in standby events in the case of performing intermittently the within-standby-period signal reception processing between a wireless video transmission device and a wireless video reception device.

This invention provides a wireless video reception device which receives a video signal that is wirelessly sent from a wireless video transmission device. The wireless video reception devices is arranged so that upon detection of the information as to the presence of a person, the number of those communication channels usable for communication with the wireless video transmission device is reduced in such a manner as to be less than the number of communication channels that are used before the detection.

This invention also provides a wireless video transmission device which wirelessly sends a video signal to a wireless video reception device. This video transmission device is arranged to have a first standby mode which intermittently searches all communication channels to be used for wireless communication between the wireless video transmission device and the wireless video reception device in order to check or verify a startup request from the wireless video reception device and a second standby mode which intermittently searches communication channels that are limited than those in the first standby mode. In cases where a person exists, transition is made to the second standby mode.

This invention also provides a wireless video transmission device which wirelessly sends a video signal to a wireless video reception device. This transmission device is arranged to intermittently search for a communication channel to be used for wireless communication between the wireless video transmission device and the wireless video reception device in order to check a startup request from the wireless video reception device in a standby mode. In a case a person is present, this search time cycle is made shorter.

This invention also provides a wireless video reception device which receives a video signal that is wirelessly sent from a wireless video transmission device. This reception device is arranged to force a radio unit's power supply to turn on in case a person is present while the radio unit power supply of the wireless video reception device is turned off.

According to this invention, communication channel candidates for use between the wireless video transmission device and wireless video reception device are limited in number or, alternatively, the time cycle of the search for a communication channel is shortened when a person is present, thereby making it possible to shorten the from-standby startup time of the wireless video transmission and reception devices and also lessen the amount of electrical power to be consumed during standby thereof.

Other objects, features and advantages of the invention will become apparent from the following description of the embodiments of the invention taken in conjunction with the accompanying drawings.

DETAILED DESCRIPTION OF EMBODIMENTS

Embodiments in accordance with this invention will be described with reference to the accompanying drawings below.

Embodiment 1

Figure 3:
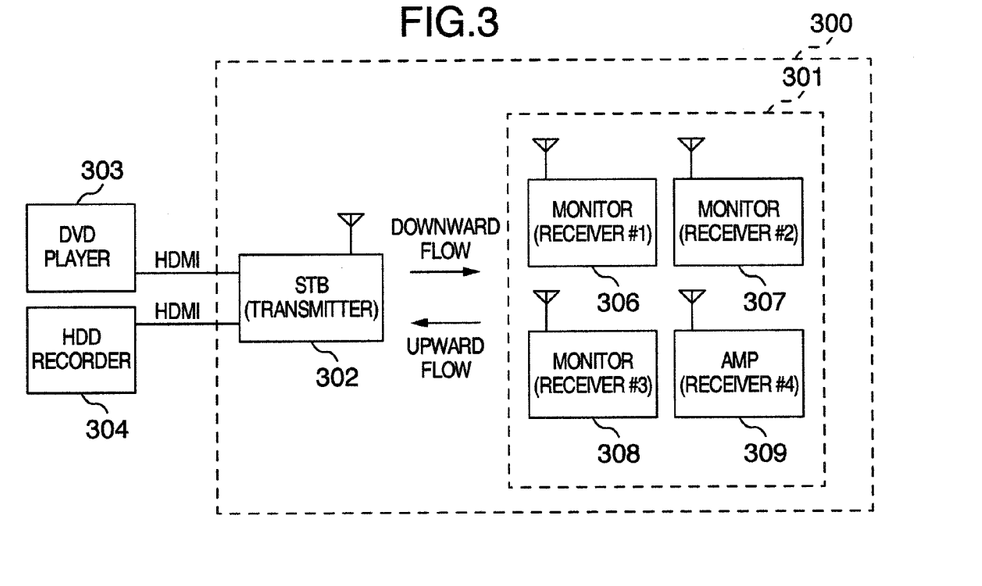
FIG. 3 is a block diagram showing one exemplary configuration of a wireless network which employs the embodiment of this invention.

FIG. 3 is a block diagram showing one example of the configuration of a wireless communication system in accordance with a first embodiment of this invention. The illustrative wireless communication system has a wireless network 300. This wireless network 300 includes a wireless or "radio" video transmission device 302 and a radio video reception group 301 which includes a plurality of radio video receiver devices 306 to 309, examples of which are a monitor, such as television (TV) receiver set or else, an amplifier for audio output, and so forth. This wireless network 300 is arranged to internally perform the following operations: wirelessly sending video and audio signals from the radio video transmitter device 302 to the radio video receiver device group 301, and communicating a control command between the radio video transmitter device 302 and radio video receiver device group 301. To the radio video transmitter device 302, equipment for output of video and audio signals is wire-connected by a signal transmission cable. Examples of the equipment include, but not limited to, a digital versatile disk (DVD) player 303 and hard disk drive (HDD) recorder 304. An example of the signal cable is a high-definition multimedia interface (HDMI) cable. It is noted that in some cases, the DVD player 303, HDD recorder 304, monitor, and amplifier or else will be called the "AV equipment" hereinafter. Also note that the radio video transmitter device 302 may be a set-top box (STB) having a tuner for receiving TV broadcast programs.

Figure 7:
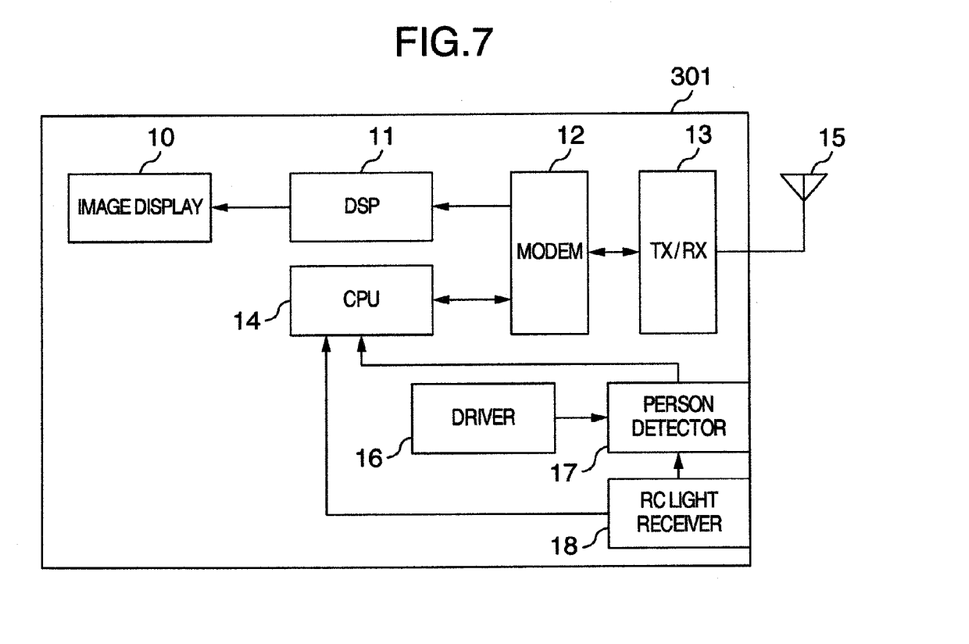
FIG. 7 is a diagram showing an exemplary configuration of a wireless video reception device in accordance with the embodiment.

An operation of the above-stated system will be explained by also using FIG. 7 below. FIG. 7 shows an exemplary configuration of one of the radio video receiver devices 306-309 in accordance with this embodiment which is applied to this system; here, it shows an example in which the radio video receiver device is a monitor display. A video/audio signal with which are superimposed a header and control command to be wirelessly transferred from the radio video transmitter device 302 is received through an antenna 15 and transmitter/receiver unit 13. This received video/audio signal is demodulated by a modulation/demodulation or "modem" unit 12. The video/audio signal that was demodulated by the modem unit 12 is supplied to a digital signal processing unit 11. The digital signal processor (DSP) 11 applies image processing or else to the demodulated video signal and then supplies this signal to an image display unit 10 provided in the post stage. The image display unit 10 is constituted, for example, from a liquid crystal display (LCD) or a plasma display panel or the like for displaying video images based on the signal from the DSP 11. Additionally, the header and control command that are superimposed with the video/audio signal are also demodulated by the modem unit 12 in a similar way. The demodulated header and control command are supplied to a central processing unit (CPU) 14.

A human body detection unit 17 functions to detect the information concerning the presence of a person or people, which is driven and controlled by a drive unit 16 to detect and determine whether a viewing person is present near or around the radio video receiver device 306, 307, 308, 309, for example (in particular, on the front side of the display plane of the image display unit 10) and then supplies its detection signal to the CPU 14. A remote control (RC) light receiving unit 18 receives an RC signal from a remote controller (not depicted), which signal was generated by a user's manual operation of a remote controller for the radio video receiver device use, and supplies it to the CPU 14. The CPU 14 analyzes the supplied header and control command and inputs the detection signal from the human body detection unit and the RC signal received by the RC light receiving unit to thereby generate a header and control command for controlling the radio video transmitter device. These header and control command are modulated by the modem unit 12 using a carrier for wireless transmission and then wirelessly sent from the transmitter/receiver unit 13 to the radio video transmitter device 302 by way of the antenna 15.

Note that the human body detector unit 17 is the one that detects and judges whether a viewing person is present near the radio video receiver device and is constituted, for example, from either a human-sensitive sensor, such as an infrared sensor, or an image pickup device, such as a camera, which is attached to a location around the image display unit 10. The human body detector 17 is modifiable to have an arrangement other than the one that directly detects a human body per se; for example, it may be arranged to indirectly detect the presence or absence of a viewing person by detection of the fact that either a wire-connected signal source or a built-in signal source (not shown), other than wireless input of the radio video receiver device, is currently selected as an external input in a state that the power supply of radio video receiver device is turned on. Other examples include an arrangement for indirectly detecting the presence or absence of a viewer by detection of receipt of a certain kind of signal by the RC light receiver unit 18 and/or by detecting using an illuminance sensor the fact that indoor brightness exceeds a given threshold value.

In FIG. 3, in a case where the user is watching and listening to a certain video reproduced from the HDD recorder 304 by the monitor (receiver device #1) that is the radio video receiver device 306, when he or she wants to switch the presently reproduced video to another playback video that is recorded in the HDD recorder 304, the user manually operates the remote controller for use with the HDD recorder 304 to thereby send to the receiver device #1 a remote control (RC) signal containing therein a control command for the playback video change. The receiver device #1 optically receives this RC signal and then wirelessly transmits the control command signal to the radio video transmitter device 302 by way of the above-stated modem unit 12, transmitter/receiver unit 13 and antenna 15.

The control command which was wirelessly sent from the radio video receiver device group 301 is received by a transmission/receiver unit via an antenna of the radio video transmitter device 302; then, this control command is subjected to kind/type analysis by a CPU within the radio video transmitter device 302. If the control command is for switching the playback video of the HDD recorder 304 as stated previously, the CPU sends this command to the HDD recorder 304 via a consumer electronics control (CEC) line of HDMI cable.

In this way, the wireless network 300 equipping the AV equipment, the radio video transmitter device 302 and radio video receiver device group 301 is constituted.

An explanation will be given below of one example of the processing (referred to as the "startup sequence" hereinafter) of from the user's startup request in a standby or "wait" period up to the actual transition to startup processing. Note here that in the explanation below, a direction of signal transmission from the radio video transmitter device 302 of FIG. 3 to the radio video receiver group 301 is defined as the downward flow whereas the inverse direction thereof is defined as the upward flow. More specifically, here, a video/audio signal and a control command of from the radio video transmitter device to the radio video receiver group become the downward direction; a control command of from the radio video receiver device to radio video transmitter device becomes the upward direction. Also note that the explanation below takes as an example a startup sequence which begins from a specific radio video receiver device 306, for purposes of brevity of explanation.

When the user wants to activate the radio video receiver device 306 within a standby time period in which s/he is watching no videos, the user manually operates a remote controller for the radio video receiver device use (for example, an operation of turning on a power button of the remote controller) to thereby transmit an RC signal that contains a control command for activation (e.g., power-on command) toward the radio video receiver device 306. The radio video receiver device 306 receives the light of this RC signal, and wirelessly transfers this control command signal to the radio video transmitter device 302.

The control command that was wirelessly sent from the radio video receiver device 306 is received by the transmission/receiver unit via the antenna (not shown) of the radio video transmitter device 302. This control command received is passed to the CPU within the radio video transmitter device 302 and subjected to kind analysis thereby. If the control command is for startup as stated supra, the CPU of the radio video transmitter device 302 performs startup processing, such as electrical power feed to respective parts of the radio video transmitter device 302, software program launching and others.

Figure 4A:
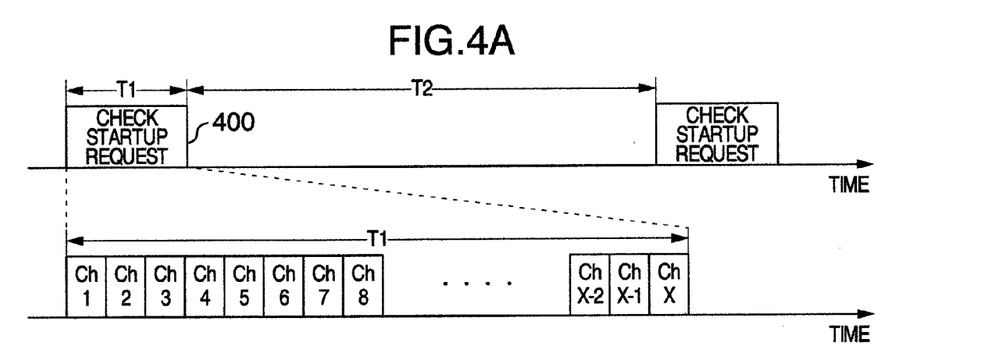
FIGS. 4A and 4B are pictorial diagrams showing a process for verification of a startup request in accordance with an embodiment.
Figure 4B:
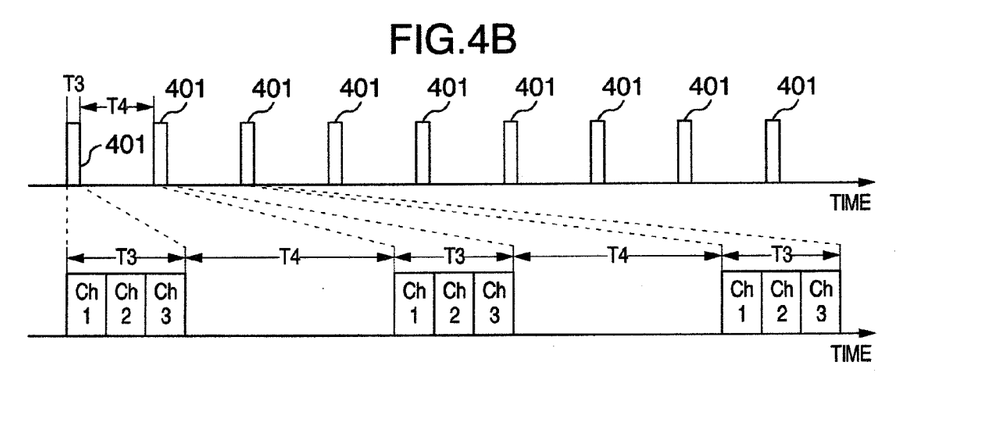

In this wireless system, in order to enable the radio video transmitter device 302 to receive the control command that was wirelessly sent from the radio video receiver device 306, it is necessary for the radio video transmitter device 302 to recognize a communication channel to be used by the radio video receiver device. To do this, within the standby time period in which any video/audio signal is not being transmitted, the radio video transmitter device 302 searches, as shown in FIGS. 4A and 4B for example, all available communication channels in the wireless system (the total channel number is denoted by "X") within a time period T1 to thereby perform verification (indicated by numeral 400 in FIG. 4A) of a startup request for checking which one of the communication channels is used by the radio video receiver device 306 to send the control command. At this time, the radio video transmitter device intermittently performs the startup request verification 400 within this standby period in order to suppress power consumption in the standby period and retain it at a low level, thereby forcing the radio video transmitter device to almost stop its operation (called the "standby operation" hereinafter) while the startup request verification 400 is not performed, i.e., within a time period T2. In this way, the radio video transmitter device is specifically arranged to repeatedly perform the startup request verification 400 and the standby operation within its standby period. This will be called the "normal standby mode" (first standby mode) hereinafter.

Figure 5A:
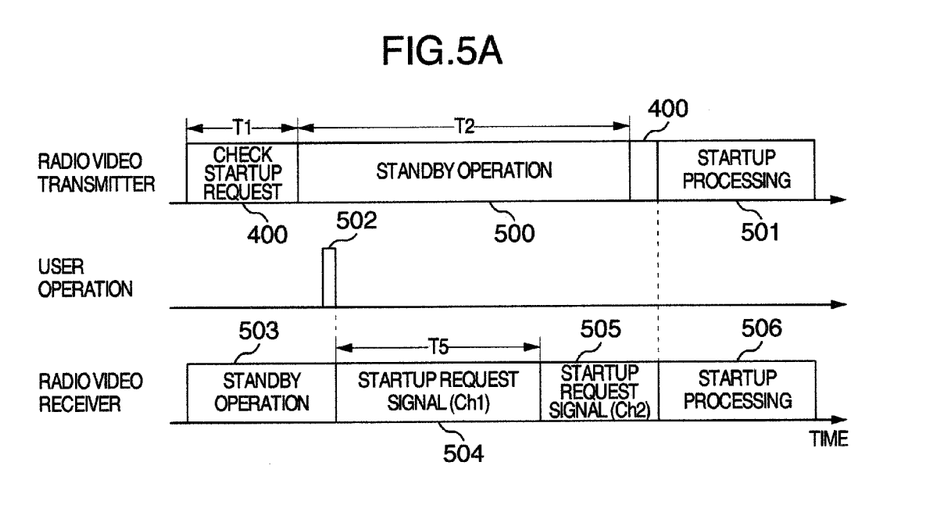
FIGS. 5A-5B are time charts of a startup sequence in accordance with this embodiment.

Next, one example of the startup sequence in the case of a control command being sent from the radio video receiver device 306 will be described with reference to FIG. 5A.

The radio video receiver device 306 also periodically repeats execution of the startup request verification 400 and a standby operation 503 within its standby time period in a similar way to the radio video transmitter device 302. A time cycle of the startup request verification 400 and a time period of the standby operation 503 in this radio video receiver device 306 may be the same as a cycle T1+T2 of the startup request verification 400 and the period T1 of standby operation 500 in the radio video transmitter device 302 or may be different therefrom.

At a given time point, when the user sends (as indicated by 502 in FIG. 5A) an RC signal which contains a control command for activation of the radio video receiver device 306 to the radio video receiver device 306, the radio video receiver device 306 first uses a communication channel "ch1," to transmit a startup request signal 504 indicative of a control command toward the radio video transmitter device within a time period T5. In case no response is obtained from the radio video transmitter device within the period T5, the radio video receiver device 306 switches the channel ch1 to a communication channel ch2 next thereto and then transmits a startup request signal (505). In case the radio video transmitter device 302 performs the startup request verification 400 and searches the communication channel ch2 during transmission of the startup request signal, this startup request signal that is the control command for activation from the radio video receiver device is received using the communication channel ch2; then, the radio video transmitter device and radio video receiver device perform the startup processing operations 501 and 506, respectively. In this way, the transmission of a startup request signal and the search for a usable communication channel by verification of a corresponding response therefrom are sequentially performed with respect to those channels of from ch1 up to ch21 under an assumption that the total channel number X is 21. Hence, in case the channels ch1-ch20 are unusable because these have already been assigned for communication with other devices, for example, the above-stated transmission of startup request signal and the verification of its corresponding response have to be done with respect to each of the channels ch1-ch20, thereby causing a time taken for searching the communication channel to increase in length, resulting in a decrease in response performance.

In the case of the above-stated one example of the startup sequence, making longer and longer the standby operation-performing period T2 makes it possible to lower the electrical power consumption within standby time period; however, this results in an increase in length of a time cycle for performing the startup request verification 400, which in turn leads to a decrease in performance of responding to the user's manual operation. For example, in the time chart of FIG. 5A, when letting T1=2 s, T2=8 s and T5=5 s, the startup processing gets started after the elapse of about 10 s in maximum since the user has completed his or her operation. This might give some sort of uncomfortable feeling to the user.

Consequently, this embodiment is arranged to limit in advance or "prelimit" (i.e., lessen) usable communication channel candidates in a case where the presence of a person is detected on the radio video receiver device side, thereby shortening the startup request verification time and thus accelerating or speeding up the activation processing. For example, as shown in FIG. 4B, in case the communication channel candidates usable on the radio video receiver device side are channels ch1-ch3, the startup request verification is not performed with respect to all available communication channels but may be performed with respect to such channels only within a time period T3 (401). For example, in case the wireless system is arranged to have communication channels whose number X is 21, when supposing that the number of usable communication channel candidates is 3, it becomes possible to perform the startup request verification within a time cycle that is shortened to one-seventh (1/7) while letting power consumption be kept almost the same as that in the case of searching all available communication channels. In other words, a specific arrangement is employed for prelimiting the usable communication channel candidates in the case of a person being detected by the radio video receiver device— that is, reducing the communication channels that are searched in the case of the person detection so that these are less in number than those in the case of no person being sensed—to thereby shorten the time cycle of the startup request verification. This mode of performing the startup request verification relating to these limited communication channels will be called the "specific standby mode" (second standby mode) in the description below. With this arrangement, it becomes possible to speed up the startup sequence of the radio video transmitter device and radio video receiver device while at the same time maintaining electric power consumption at substantially the same level as that in the case of searching all communication channels.

Figure 5B:
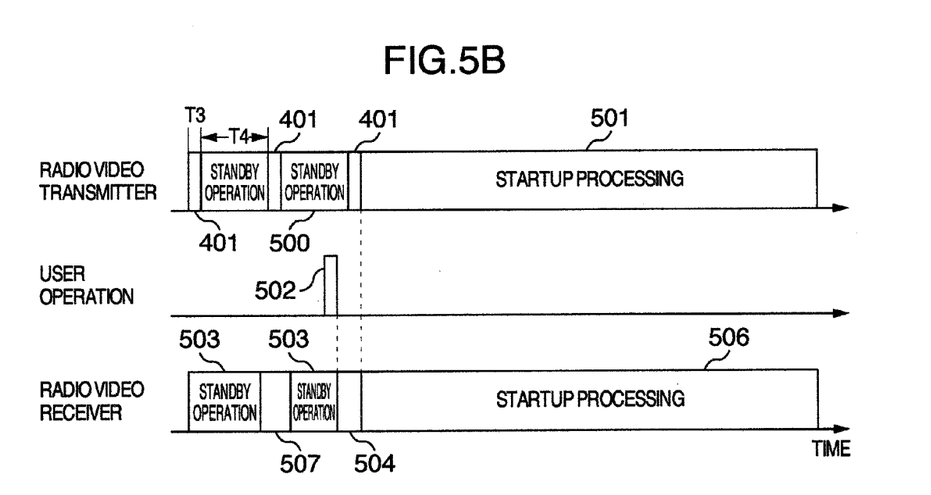

Next, a startup sequence in the specific standby mode of this embodiment will be described with reference to FIG. 5B.

In the specific standby mode, the radio video receiver device 306 also repeats startup request verification 507 and standby operation 503 periodically in a similar manner to the radio video transmitter device 302. A time cycle of the startup request verification 400 and a time period of the standby operation 503 at the radio video receiver device 306 in the specific standby mode may be the same as a time cycle T3+T4 of the startup request verification 400 and a period T3 of standby operation 500 at the radio video transmitter device 302 in the specific standby mode or, alternatively, may be different therefrom.

At a certain time point, when the user sends (as indicated by numeral 502 in FIG. 5B) to the radio video receiver device 306 an RC signal which contains a control command for activation of the video receiver device 306, this video receiver device 306 uses a specific channel which is the candidate-prelimited usable communication channel, e.g., channel ch1, to transmit (504) a startup request signal for use as the control command toward the radio video transmitter device 302. In case the radio video transmitter device performs startup request verification 401 and searched the communication channel ch1 during transmission of the startup request signal, this channel ch1 is used to receive the startup request signal that is the control command for activation as sent from the radio video receiver device. Then, the radio video transmitter and receiver devices perform the startup processing operations 501 and 506, respectively.

As stated above, in the specific standby mode in accordance with this embodiment, the time cycle for performing the startup request verification 401 in the startup sequence is short; so, the performance of responding to the user's manual operations improves accordingly.

Figure 1:
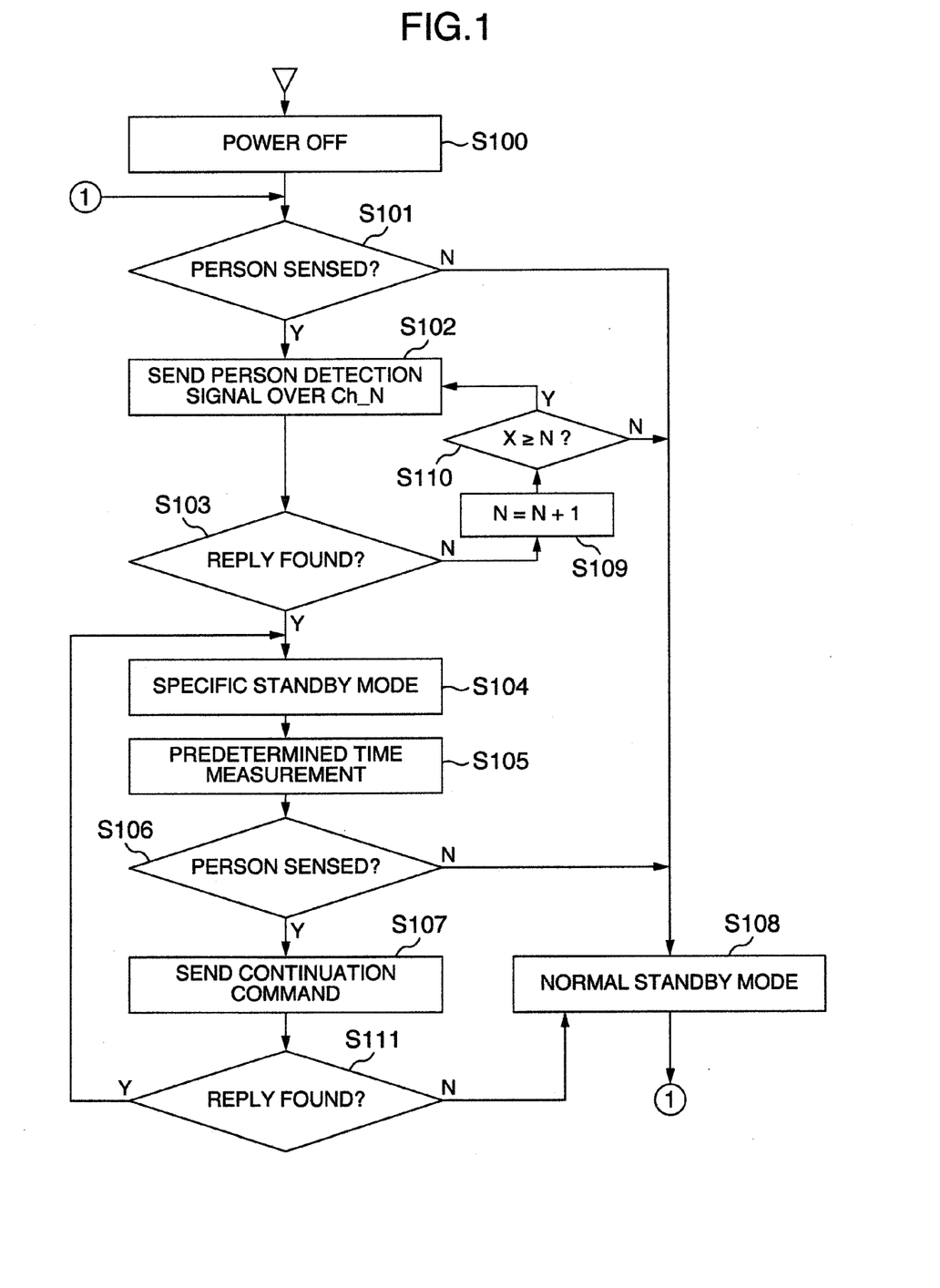
FIG. 1 is a flow chart of a processing operation of a device having a human body detection unit in accordance with one embodiment of this invention.

An explanation will next be given, using a flowchart of FIG. 1, of the processing to be executed by the CPU 14 of the radio video reception device for transition between the normal standby mode and the specific standby mode using the human body detector unit 17 in this embodiment.

In a case where the radio video receiver device is powered off (at step S100), the human body detector 17 detects the information concerning the presence of a person for determination of whether a person is present near the radio video receiver device (at step S101). In case any person is absent, transition is made to the normal standby mode (at S108). In this normal standby mode, the startup request verification which searches all communication channels is performed in the way stated supra. Note here that the judgment of whether a person is present or absent by means of the human body detector 17 (at S101) may be performed on an all-time basis or, alternatively, may be synchronized with the intermittently performed startup request verification 507.

On the other hand, in case it is judged by the human body detector 17 that a person is present, a person detection signal is transmitted (at step S102) to the radio video transmitter device over a communication channel ch_N. Then, a decision is made (at S103) as to whether there is a reply command from the radio video transmitter device with respect to the person detection signal transmitted. Here, let the default value of N be "1." More specifically, the person detection signal is sent via the communication channel ch1 at first. In case there is a reply command from the radio video transmitter device, transition is done to the specific standby mode (at S104), followed by execution of the startup request verification 507 which searches limited communication channel candidates only. Alternatively, in case there is not any reply command from the radio video transmitter device, "1" is added (at S109) to the value of the communication channel number N. Then, judgment is made (at S110) as to whether such value of N is less than or equal to the total communication channel number X (e.g., 21). In case the N value is less than or equal to X, the procedure goes to step S102 again; if it is larger than X then transit to the normal standby mode.

After having transited to the specific standby mode, the CPU 14 measures (at step S105) a time elapsed after having received the reply command. In case a predetermined length of time has been elapsed since the reception of the reply command, whether a person is present or absent is again judged (at step S106) by the human body detector unit 17. In case no person is present, transition is made to the normal standby mode (at S108). On the other hand, if a person is present, a specific communication channel (e.g., the communication channel that received the reply command from the radio video transmitter device at 5103) is used to transmit (at S107) to the radio video transmitter device a continuation command for instructing it to continue the above-noted specific standby mode, followed by judgment (at S111) as to whether there is a reply command from the radio video transmitter device in response to this continuation command. If there is such reply, the radio video receiver device per se continues the specific standby mode (at S104). If there is no reply then transit to the normal standby mode (at S108).

Desirably, the reply command is arranged to contain therein any one of the information for allowing the radio video transmitter device and radio video receiver device to limit the communicable channel candidates, information concerning the number of those equipments existing within a communicable network, information about the length of a time taken up to time-out of the specific standby mode, and a signal indicative of the fact that the radio video transmitter device has received the command from the radio video receiver device.

The processing operations of the steps S102-S103 and S109-S110 are also used for selection of the above-stated usable communication channel candidates. Regarding this selection, an explanation will be given later.

Figure 2:
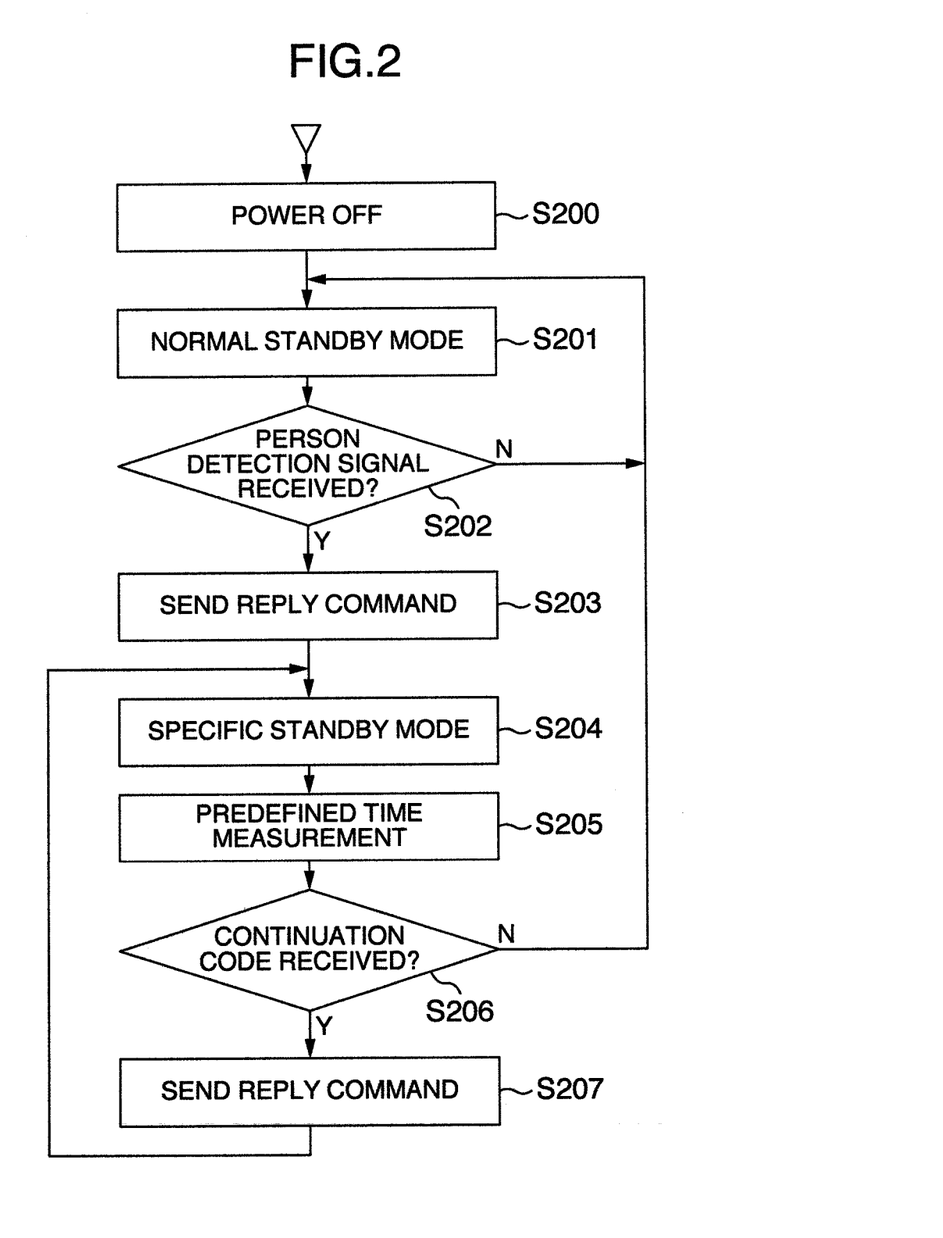
FIG. 2 is a flowchart of a processing operation of a device operatively associated with the device having the human body detector unit in accordance with the embodiment.

An explanation will now be given of the processing to be executed by the CPU of the radio video transmitter device with reference to FIG. 2.

In case the radio video transmitter device is powered off (at step S200), control is provided to transit to the normal standby mode (at step S201). In the normal standby mode, the startup request verification 400 which searches all the communication channels is performed in the way stated above. The radio video transmitter device retains the normal standby mode (at step S201) until it receives a person detection signal from the radio video receiver device (at S202). Upon receipt of the person detection signal (at S202), it transmits (at S203) the above-stated reply command with respect to this person detection signal toward the radio video receiver device. After the signal transmission, transition is made to the specific standby mode (at S204), for performing the startup request verification 401 which searches currently usable communication channel candidates only. Thereafter, the length of a time is measured (at S205) which is taken since transmission of the reply command. Then, judgment is made (S206) as to whether the above-stated continuation command from the radio video receiver device is to be received within a time period of from the transmission of the reply command up to the elapse of a prespecified time. When the continuation command is received, the above-stated reply command is sent (S207) to the radio video receiver device. In case it is unable to receive the continuation command until a given length of time elapses, transition is made to the normal standby mode (at S201). Note here that it is also permissible to multiplex the information of a time taken up to the time-out of the specific standby mode into the reply command or, alternatively, multiplex the information of a continuation command transmission time cycle in the person detection signal. To do this, it is desirable to set the prespecified time used in the step S205 so that this is longer than the predetermined time of the radio video receiver device at step S105 shown in FIG. 1.

One example of the processing for selecting usable communication channel candidates in the specific standby mode will next be described with reference to FIGS. 1 and 6.

Figure 6:
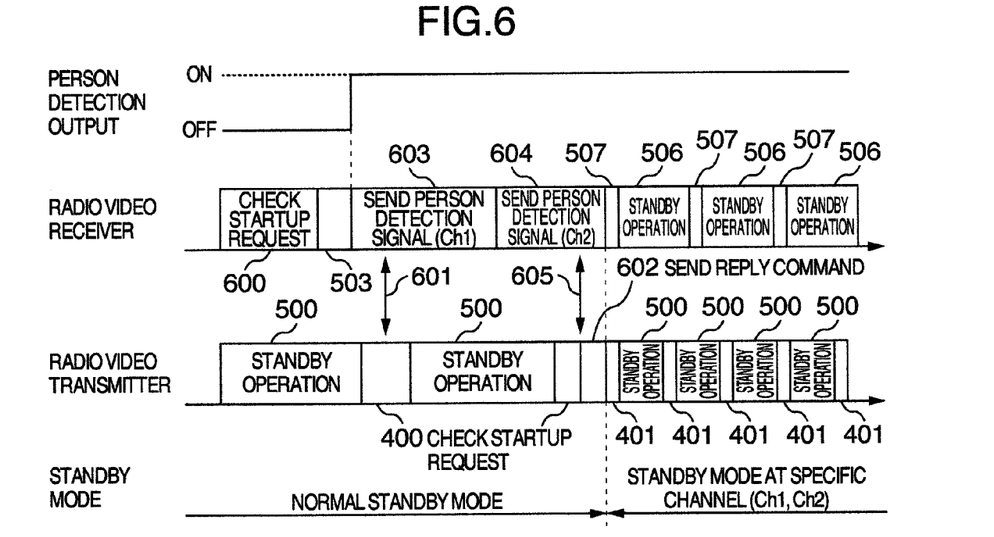
FIG. 6 is a time chart of a standby mode transition operation in accordance with the embodiment.

In the normal standby mode, when an output of the human body detector 17 of the radio video receiver device changed from the OFF state (i.e., no-person detection state) to ON state (person-detected state), the radio video receiver device transmits (at step S102 of FIG. 1) the person detection signal by using a communication channel ch_N (at first, N=1) as indicated by numeral 603 in FIG. 6. The radio video transmitter device receives (601) the person detection signal from the radio video receiver device in the process of performing the startup request verification 400 intermittently, and regards a communication channel ch1 as the channel usable for communication, and then stores the information of this communication channel candidate in any one of a semiconductor memory (not depicted) and an internal storage region of the CPU of the radio video transmitter device (these will collectively be called the "storage unit" hereinafter). Then, at step S103 of FIG. 1, the radio video receiver device determines whether there is a reply command from the radio video transmitter device. In the example of FIG. 6, the radio video receiver device receives no such reply command from the radio video transmitter device so that "1" is added to the value of N to thereby switch the communication channel to a channel ch2 at step S109 of FIG. 1. Here, the total communication channel number X is 21. The N's value (i.e., 2) is less than or equal to X. Thus, the procedure returns to step S102 for sending the person detection signal again (as shown by "604" in FIG. 6). In a similar way to the case of the channel ch1, the radio video transmitter device receives (605) the person detection signal from the radio video receiver device in the process of intermittently performing the startup request verification 400, and decides a communication channel ch2 to be the usable communication channel candidate, and then stores the information of this channel ch2 in the storage unit. At this time, "ch1" and "ch2" are to be stored in the storage unit as the information of currently usable communication channels. In case the number of such usable communication channel candidates being saved in the storage unit reaches a prespecified number (in FIG. 6, the case of two channel candidates is shown as an example), the radio video transmitter device transmits (602) its reply command to the radio video receiver device. The radio video transmitter device which has sent the reply command and the radio video receiver device that has received this reply command go into the specific standby mode. Hence, in this example, the radio video transmitter device is expected to search two communication channels consisting of the channels ch1 and ch2 in the event of startup request verification in the specific standby mode.

In this way, those communication channel candidates which are to be searched in the specific standby mode are selected. In the specific standby mode to which transition is made when the presence of a person is detected, a reduced or "limited" number of communication channels are subjected to the search, which number is less than the number of those channels to be searched in the normal standby mode, i.e., the total channel number.

The selection of communication channel candidates should not exclusively be limited to the above-noted example and may be replaced, for example, by a method having the steps of presetting a plurality of communication channel candidates (e.g., channels ch1 to ch3) and using them in the specific standby mode. Another method may also be employed which includes the steps of having searched in advance and prestored, before the detection of a person by the human body detector 17, those channel candidates (i.e., currently unused or "idle" channels) usable for communication between radio video receiver and transmitter devices, and using them in the specific standby mode.

As has been stated above, according to this embodiment, in a case where the radio video receiver device detects the presence of a person using the human body detector, usable communication channel candidates are reduced or limited in number. This makes it possible to shorten the time cycle of the intermittently performed startup request verification without having to increase the standby power, thereby enabling speed-up of the startup sequence. In addition, even when once-limited communication channel candidates become unusable due to a change in radio wave condition or else, it is still possible, by transition to the normal standby mode in case there is no reply command in response to a continuation command, to prevent the occurrence of a mismatch in power supply condition between the radio video receiver device and the radio video transmitter device.

Although in this embodiment one illustrative example with the human body detector 17 being attached to the radio video receiver device was shown, this detector may be attached to the radio video transmitter device. It would readily occur to those skilled in the art that this embodiment is also applicable in a similar way even in cases where the radio video receiver and transmitter devices are interchanged in function with each other.

Embodiment 2

Figure 8A:
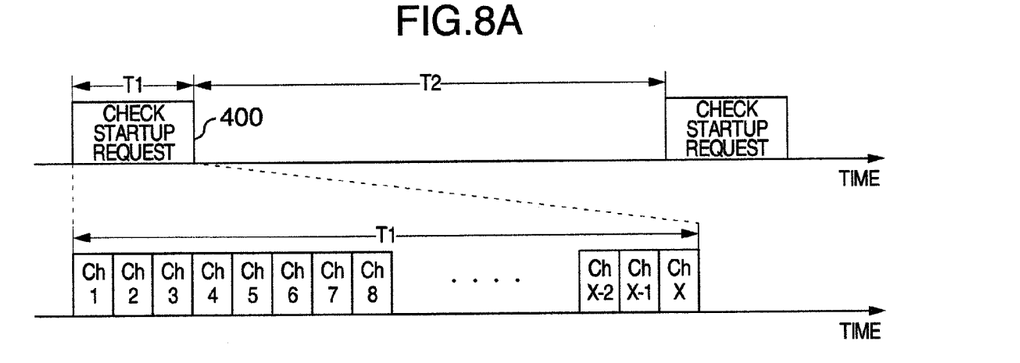
FIGS. 8A and 8B are pictorial diagrams showing a process for verification of a startup request in accordance with another embodiment of the invention.

A second embodiment of this invention will be explained using FIGS. 8A and 8B below. The second embodiment is different from the first embodiment in selection of communication channels to be searched in the process of verifying a startup request in the specific standby mode in the radio video transmitter device and radio video receiver device.

Figure 8B:
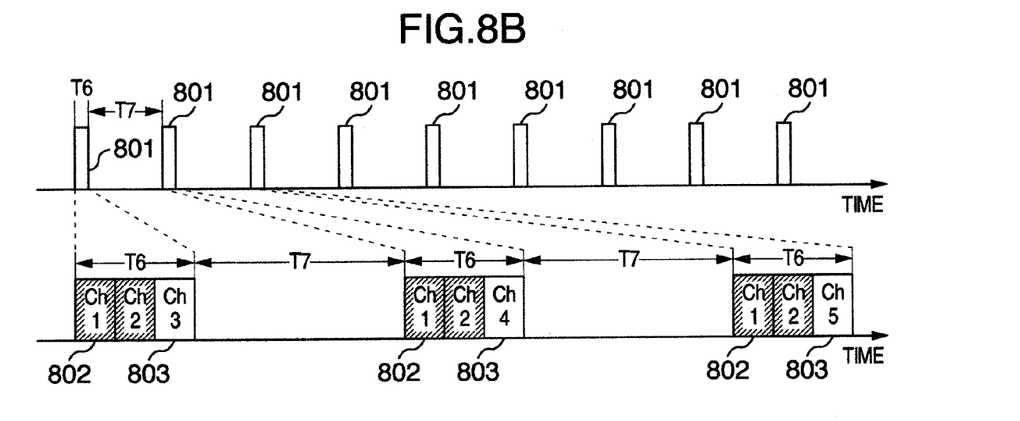

FIG. 8B shows one example of the process of such startup request verification in the case of the second embodiment being applied. FIG. 8A is the same as FIG. 4A.

As previously stated, in the radio video transmitter device and radio video receiver device which intermittently perform signal reception processing within their standby time periods, it becomes possible, by limiting the channel candidates usable for communication between the radio video transmitter and receiver devices by use of the human body detector, to shorten the time as taken for activation from the standby state of each of the radio video transmitter and receiver devices and also reduce the standby power thereof.

In the second embodiment, in a case where a person is detected on the radio video receiver device side, startup request verification of all channels is also performed while prelimiting usable communication channel candidates, thereby achieving speed-up of activation processing and improvement of stability of startup sequence. A time period T6 for the startup request verification in the specific standby mode consists essentially of a first period 802 in which the limited communication channel candidates are assigned and a second period 803 which comes next to this first period 802 and in which at least one of those communication channels other than the communication channel candidates is assigned. In FIG. 8B, there is shown a case where the limited communication channel candidates are channels ch1 and ch2 as an example.

In the case of the limited (selected) communication channel candidates being ch1 and ch2, these channels ch1 and ch2 are assigned within the first period 802 in a similar way to the first embodiment stated supra. On the other hand, one of those communication channels other than the channel candidates is assigned within the second period 803. Supposing that the total communication channel number is 21 for example, respective channels ch3-ch19 are sequentially assigned within the second period 803 during verification of 19 startup requests. For instance, in the example of FIGS. 8A-8B, a channel ch3 is assigned within the second period 803 in the first startup request verification period; channel ch4 is assigned within the second period 803 in the next startup request verification period; and, ch5 is assigned within the second period 803 in the further next startup request verification period.

By arranging the startup request verification time period in this way, it becomes possible to set longer the time cycle for startup request verification with respect to all communication channels while simultaneously shortening the time taken for startup request verification of the limited communication channel candidates. Accordingly, even when the limited communication channel candidates (e.g., ch1, ch2) become unusable due to a change in radio wave condition or the like, it is still possible to use other communication channels (e.g., ch3, ch4. etc.), thereby improving the stability of the startup processing of the whole wireless transmission/reception system. For example, suppose that the limited communication channel candidate number is 2. Assume that the number of communication channels to be assigned within the second period 803 is 1. In this case, the startup request verification 801 is performed in such a way as to search communication channels in the following order:

1, 2, 3, Standby (T7), 1, 2, 4, Standby (T7), 1, 2, 5, . . . . Desirably, the above-stated cycle of the startup request verification with respect to all communication channels is set at 10 s or less.

As apparent from the foregoing description, according to this embodiment, when the radio video receiver device detects the presence of a person by using the human body detector, control is provided to assign the limited communication channel candidates on a priority basis and, simultaneously, shorten the cycle of the intermittently performed startup request verification when compared to that in the normal standby mode, thereby to achieve acceleration of the startup sequence. In addition, by searching all communication channels, the startup sequence improves in stability even when the limited communication channel candidates become unusable due to a change in radio wave condition or the like. Thus, it becomes possible to avoid the occurrence of a mismatch in power supply condition between the radio video receiver device and radio video transmitter device.

Although in the second embodiment a single communication channel is assigned within the second period 803, this is not to be construed as limiting the invention and may also be modified to assign two or more communication channels.

Embodiment 3

Figure 9A:
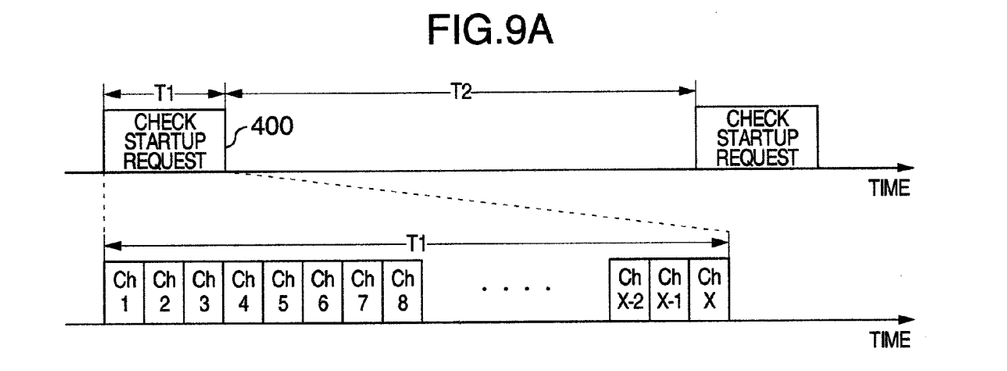
FIGS. 9A-9B are pictorial diagrams showing a process for verification of a startup request in accordance with a further embodiment of the invention.
Figure 9B:
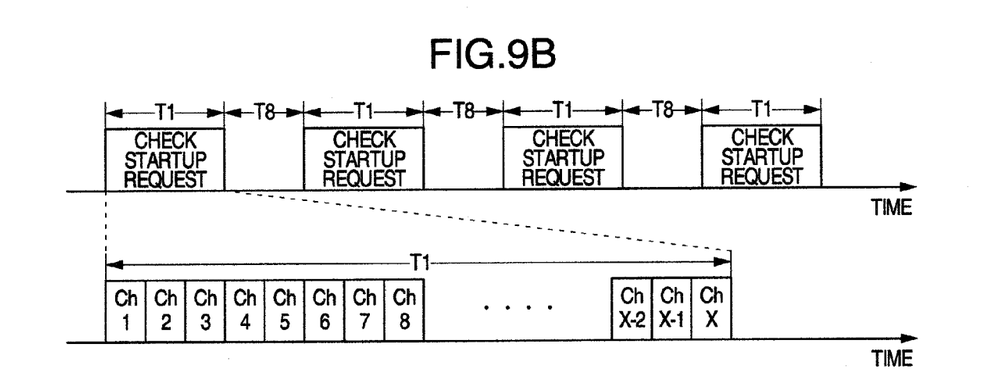

Next, a third embodiment of this invention will be described with reference to FIGS. 9A and 9B. The third embodiment is different from the first embodiment in that a search is conducted with respect to every communication channel in the event of startup request verification in the specific standby mode in the radio video transmitter device and radio video receiver device.

In the third embodiment, in the radio video transmitter and receiver devices which intermittently perform signal reception processing within their standby periods, when detecting the presence of a person by the human body detector, the time cycle of the startup request verification 400 is set shorter than that in the normal standby mode. With this arrangement, it is possible to improve the response performance to the user's operations and speed up the activation of the radio video transmitter and receiver devices, although electrical power consumed during standby increases when compared to the normal standby mode.

As a matter of course, the specific standby mode may be arranged to search only selected communication channel candidates as in the first embodiment, rather than searching all available channels for the startup request verification purpose while shortening the startup request verification cycle as in the third embodiment. Another employable arrangement is that while shortening the startup request verification cycle in the specific standby mode as in the third embodiment, the startup request verification is modified to search the selected communication channel candidates and other communication channels as in the second embodiment. Arranging in this way makes it possible to suppress an increase in power consumption while simultaneously speeding up the startup of the video receiver device.

Embodiment 4

A fourth embodiment of this invention differs from the first embodiment in that it does not perform the communication channel-searching intermittent signal reception operation when the radio video receiver device executes startup request verification in the normal standby mode.

In the fourth embodiment, in a case where the presence of a person is not detectable by the human body detector, the signal reception processing within the standby period is not performed; in addition, the power supply of a radio unit (e.g., a wireless communication module including the modem unit, transmitter/receiver unit and others) is forced to turn off, thereby making it possible to reduce power consumption. For example, in the startup request verification process shown in FIGS. 4A-4B, when the presence of a person is not detectable by the human body detector, control is provided to maintain the standby operation of the time period T2. Upon detection of the presence of a person, the above-noted radio unit is controlled so that the startup request verification of the period T1 is performed for the first time. This control is performed by the CPU 14 of the radio video receiver device and/or the CPU of the radio video transmitter device.

In case the TV receiver set that is the radio video receiver device has its own built-in radio unit or offers cooperative functionality, the radio unit is powered off when the TV set is in its standby state. In this power-off state, when the presence of a person is detected by the human body detector, the device may also be designed to go into the specific standby mode stated above. By powering off the radio unit prior to detection of the presence of a person in this way, it is possible to enhance the power-saving effect. Traditionally, the human detector-based TV power-saving technique has been used in order to force TV to go into the standby mode while no person is found near or around the TV; according to this invention, the power-saving feature is also usable effectively for setting the radio video receiver device in the standby state when the TV set is in standby also.

Additionally, in the process of the startup request verification to be executed upon detection of the presence of a person by the human body detector, the method for searching all communication channels may be employed. Alternatively, a technique is employable for searching only the limited number of communication channel candidates by the method of the first embodiment stated supra. Obviously, it is also permissible to search both the limited communication channel candidates and at least one of the other communication channels, as in the second embodiment.

INDUSTRIAL APPLICABILITY

This invention is adaptable for use in wireless data communications systems for transmitting over-the-air a video/audio signal(s) from a radio video transmitter device to a radio video receiver device. Especially, in such systems, this invention is suitably employable in the case of speeding up the activation operation relative to the startup processing based on the user's manual operations, for example.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless video reception device configured to receive a video signal sent wirelessly from a wireless video transmission device, said wireless video reception device comprising:
a human detection unit which detects information concerning presence of a person;
a transmitter/receiver unit which, by using one of a predetermined number of communication channels, receives the video signal from said wireless video transmission device and performs wireless communication with said wireless video transmission device; and
a control unit which is coupled to said human detection unit, wherein
said control unit transmits, from said transmitter/receiver unit to said wireless video transmission device, a person-detection signal based on the detected information, by using a preset one of said predetermined number of communication channels, when the presence of the person is detected by said human detection unit while operating in a first standby mode of said wireless video reception device, wherein in the first standby mode, said wireless video reception device intermittently searches all said predetermined number of communications channels to be used for wireless communication,
and when said transmitter/receiver unit receives a reply command in response to said person-detection signal from said wireless video transmission device, said wireless video reception device transitions to a second standby mode which intermittently searches selected communication channels selected from and fewer in number than said predetermined number of said communication channels, where the selected communication channels are selected based on a predetermined selection scheme;
said control unit, when a control command for starting said wireless video transmission device or said wireless video reception device is received in said second standby mode, sends from said transmitter-receiver unit a startup request signal based on said control command, by using one of said selected communication channels, and
wherein said selected communication channels include the communication channel via which said person-detection signal is transmitted.

2. The wireless video reception device according to claim 1, wherein said human detection unit is one of a person-sensitive sensor and an image pickup device.

3. The wireless video reception device according to claim 1, wherein said human detection unit detects, as the information concerning the presence of a person, a remote control signal from a remote controller to be used for operation of said wireless video reception device.

4. The wireless video reception device according to claim 1, wherein said human detection unit detects, as the information concerning the presence of a person, a signal-output signal from a signal output device being wire-connected to said wireless video reception device.

5. The wireless video reception device according to claim 1, wherein when the presence of a person is detected by said human detection unit in said first standby mode, said control unit transmits from said transmitter/receiver unit said person-detection signal representing the detection of the presence of a person to said wireless video transmission device by sequentially switching said predetermined number of communication channels, and shifts to said second standby mode when said transmitter/receiver unit receives a reply command with respect to said person-detection signal from said wireless video transmission device.

6. The wireless video reception device according to claim 5, wherein said selected communication channels are communication channels used for transmitting said person-detection signal to said wireless video transmission device from among said predetermined number of communication channels.

7. A wireless video transmission device configured to wirelessly send a video signal to a wireless video reception device, said wireless video transmission device comprising:
   a transmitter/receiver unit which transmits the video signal to said wireless video reception device by using one of a predetermined number of communication channels which are used for wireless communication with said wireless video reception device, and receives a startup request signal transmitted from said wireless video reception device by using one of said predetermined number of communication channels; and
   a control unit which controls, in order to receive the startup request signal transmitted from said wireless video reception device by said transmitter/receiver unit, transition between a first standby mode in which said wireless video transmission device intermittently searches all of said predetermined number of communication channels, and a second standby mode in which said wireless video transmission device intermittently searches selected communication channels selected from and fewer in number than said predetermined number of said communication channels, where the selected communication channels are selected per a predetermined selection scheme;
   said transmitter/receiver unit is configured to receive, while operating in said first standby mode, a person-detection signal based on presence of a person and transmitted from said wireless video reception device, by using a preset one of said predetermined number of communication channels, wherein
   said control unit is configured to perform transition from the first standby mode to the second standby mode when said transmitter/receiver unit receives said person-detection signal based on presence of a person, and wherein
   said selected communication channels to be searched in the second standby mode includes the communication channel via which said person-detection signal based on presence of a person is transmitted.

8. The wireless video transmission device according to claim 7, wherein said transmitter/receiver unit receives said person-detection signal concerning the presence of a person which was sent from said wireless video reception device over the preset one of said predetermined number of communication channels, and is capable of sending a reply command in response to receipt of said person-detection signal to said wireless video reception device via any one of the predetermined number of communication channels and another communication channel, and wherein
   said any one of the predetermined number of communication channels and another communication channel, are used as limited communication channels to be searched in said second standby mode.

9. The wireless video transmission device according to claim 8, further comprising a storage unit which stores therein information of said any one of the predetermined number of communication channels and another communication channel, wherein the information of said any one of the predetermined number of communication channels and another communication channel being stored in said storage unit, is arranged to be sent by said transmitter/receiver unit to said wireless video reception device.

10. The wireless video transmission device according to claim 8, wherein at least one communication channel other than said limited communication channels, is further searched in said second standby mode.

\* \* \* \* \*